US012406543B2

(12) United States Patent
Etou et al.

(10) Patent No.: US 12,406,543 B2
(45) Date of Patent: Sep. 2, 2025

(54) VOTING SYSTEM AND VOTING METHOD

(71) Applicant: NEC Corporation, Tokyo (JP)

(72) Inventors: Yoshiyuki Etou, Tokyo (JP); Wataru Itonaga, Tokyo (JP); Daisuke Matsuda, Tokyo (JP); Ryo Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 30 days.

(21) Appl. No.: 18/282,016

(22) PCT Filed: Mar. 19, 2021

(86) PCT No.: PCT/JP2021/011441
§ 371 (c)(1),
(2) Date: Sep. 14, 2023

(87) PCT Pub. No.: WO2022/195860
PCT Pub. Date: Sep. 22, 2022

(65) Prior Publication Data
US 2024/0153332 A1 May 9, 2024

(51) Int. Cl.
*G07C 13/00* (2006.01)
*H04L 9/08* (2006.01)

(52) U.S. Cl.
CPC .............. *G07C 13/00* (2013.01); *H04L 9/085* (2013.01); *H04L 2209/463* (2013.01)

(58) Field of Classification Search
CPC .... G07C 13/00; H04L 9/085; H04L 2209/463
USPC ........................................................ 235/51
See application file for complete search history.

(56) References Cited

U.S. PATENT DOCUMENTS

| | | | | |
|---|---|---|---|---|
| 2019/0288846 A1* | 9/2019 | Zawierka | ............... | G06Q 30/00 |
| 2019/0384748 A1* | 12/2019 | Roennow | ............. | G06F 16/1837 |
| 2020/0351083 A1* | 11/2020 | Bartolucci | ............. | H04L 9/3247 |
| 2021/0049690 A1* | 2/2021 | Wright | ................... | H04L 9/3066 |
| 2021/0135855 A1* | 5/2021 | Sunkavally | ............ | H04L 9/0825 |
| 2022/0035932 A1* | 2/2022 | Baldi | ...................... | G06F 21/602 |
| 2022/0158892 A1* | 5/2022 | Fedorov | .............. | G06F 11/1482 |

(Continued)

FOREIGN PATENT DOCUMENTS

| | | |
|---|---|---|
| JP | 2003-099557 A | 4/2003 |
| JP | 2004-13606 | 1/2004 |

(Continued)

OTHER PUBLICATIONS

JP Office Action for JP Application No. 2023-506675, mailed on Sep. 3, 2024 with English Translation.

(Continued)

*Primary Examiner* — Allyson N Trail

(57) ABSTRACT

A voting system and a voting method by which electronic voting can be securely conducted are provided. A voting system includes: a secret sharing unit that generates a plurality of shares from voting information by secret sharing; a plurality of share storage units that store the plurality of shares in a distributed manner; a first blockchain processing unit that transmits, to a node managing a blockchain, transaction data of voting conducted using the voting information in order to record the transaction data in the blockchain; and a secure computation unit that performs secure computation for analyzing the voting by using the shares stored in a distributed manner.

12 Claims, 7 Drawing Sheets

(56) References Cited

U.S. PATENT DOCUMENTS

| | | | | |
|---|---|---|---|---|
| 2022/0173917 A1* | 6/2022 | Basu | .................. | H04L 63/1458 |
| 2022/0253813 A1* | 8/2022 | Pospieszalski | ........... | H04L 9/50 |
| 2022/0271957 A1* | 8/2022 | Zamani | ................ | H04L 9/3239 |
| 2024/0007479 A1* | 1/2024 | Doney | ................... | H04L 63/12 |
| 2024/0153332 A1* | 5/2024 | Etou | ..................... | G07C 13/00 |
| 2024/0338682 A1* | 10/2024 | Anton | ...................... | H04L 9/50 |

FOREIGN PATENT DOCUMENTS

| | | |
|---|---|---|
| JP | 2004-192029 A | 7/2004 |
| JP | 2011-248436 A | 12/2011 |
| JP | 2018-101380 A | 6/2018 |
| KR | 2020-0077366 A | 6/2020 |
| WO | 2009/014215 A1 | 1/2009 |
| WO | 2019/173519 | 9/2019 |

OTHER PUBLICATIONS

International Search Report for PCT Application No. PCT/JP2021/011441, mailed on Jun. 22, 2021.

\* cited by examiner

VOTING SYSTEM AND VOTING METHOD

This application is a National Stage Entry of PCT/JP2021/011441 filed on Mar. 19, 2021, the contents of all of which are incorporated herein by reference, in their entirety.

TECHNICAL FIELD

The present disclosure relates to a voting system and a voting method.

BACKGROUND ART

Technologies for conducting electronic voting are known. For example, Patent Literature 1 discloses a compilation system that allows disclosure of vote distributions in which the corresponding relations between candidates and their votes are concealed. This compilation system is configured to disclose, instead of disclosing a list of decrypted plaintexts, a list of conversion and decryption results, and further disclose information (conversion and decryption result proof data) that enables verification that the conversion and decryption results are correct without using the list of decrypted plaintexts.

CITATION LIST

Patent Literature

Patent Literature 1: International Patent Publication No. WO 2009/014215

SUMMARY OF INVENTION

Technical Problem

In recent years, there has been a growing increase in the use of Information and Communication Technology (ICT) for social activities, and hence there has been a demand that new systems for conducting electronic voting be provided.

Therefore, one of the objects that are achieved by an example embodiment disclosed herein is to provide a voting system and a voting method by which electronic voting can be securely conducted.

Solution to Problem

A voting system according to a first example aspect of the present disclosure includes:
- secret sharing means for generating a plurality of shares from voting information by secret sharing;
- a plurality of share storage means for storing the plurality of shares in a distributed manner;
- first blockchain processing means for transmitting, to a node configured to manage a blockchain, transaction data of voting conducted using the voting information in order to record the transaction data in the blockchain; and
- secure computation means for performing secure computation for analyzing the voting by using the shares stored in a distributed manner.

A voting method according to a second example aspect of the present disclosure includes:
- generating a plurality of shares from voting information by secret sharing;
- storing the plurality of shares in a distributed manner;
- transmitting, to a node configured to manage a blockchain, transaction data of voting conducted using the voting information in order to record the transaction data in the blockchain; and
- performing secure computation for analyzing the voting by using the shares stored in a distributed manner.

Advantageous Effects of Invention

According to the present disclosure, it is possible to provide a voting system and a voting method by which electronic voting can be securely conducted.

EXAMPLE EMBODIMENT

Outline of Example Embodiment

Figure 1:
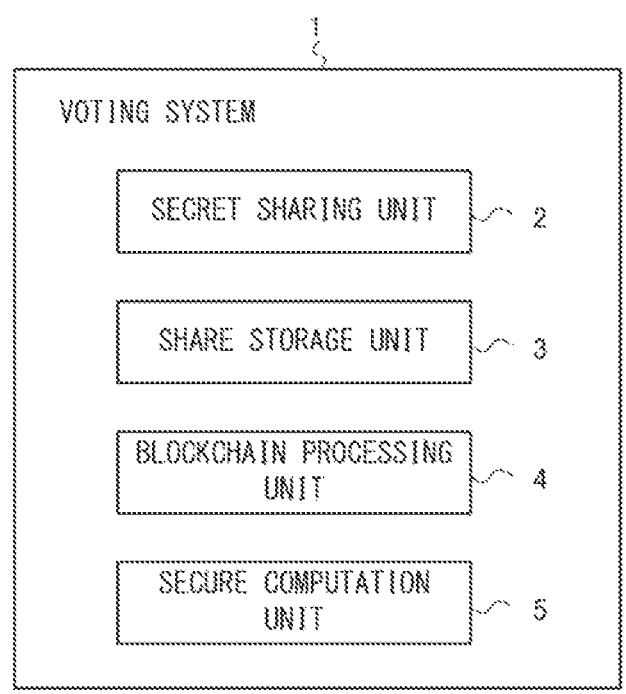
FIG. 1 is a block diagram showing an example of a configuration of a voting system according to an outline of an example embodiment.

Prior to describing an example embodiment in detail, an outline of the example embodiment will be given first. FIG. 1 is a block diagram showing an example of a configuration of a voting system 1 according to the outline of the example embodiment. As shown in FIG. 1, the voting system 1 includes a secret sharing unit 2, a share storage unit 3, a blockchain processing unit 4, and a secure computation unit 5.

The secret sharing unit 2 generates a plurality of shares (also refers to as distributed information) from voting information by secret sharing. That is, one piece of voting information is divided into N (N is an integer greater than or equal to two) shares (distributed information). Note that, although original voting information cannot be restored from one share, voting information can be restored by collecting M (M is an integer greater than or equal to two and less than or equal to N) shares out of N shares.

The voting system 1 includes a plurality of share storage units 3. The plurality of share storage units 3 store a plurality of shares generated by the secret sharing unit 2 in a distributed manner. When N shares are generated for one piece of voting information, the voting system 1 includes, for example, N share storage units 3. However, the shares may be stored in more than N share storage units 3, or in fewer than N share storage units 3.

The blockchain processing unit 4 transmits to the node that manages a blockchain transaction data of voting conducted using voting information in order to record the transaction data in the blockchain. This node is a node composing a blockchain network. By the above configuration, the node performs processing for recording transaction data in the blockchain. The transaction data recorded in the blockchain is any history of voting action based on voting information. For example, transaction data recorded in the blockchain may include data for identifying voters, data indicating the content of the voting, or data indicating the date and time of the conduction of the voting. The blockchain is an information group in which blocks, which compose a set of transaction data, are connected, and is ledger information managed on a network in a distributed manner. The blockchain having the above characteristics is typically tamper-resistant. By recording transaction data of voting in the blockchain, voting fraud can be prevented.

The secure computation unit 5 performs secure computation for analyzing voting by using the shares stored in a distributed manner. For example, the secure computation unit 5 performs secure computation by performing Multi-party computation (MPC).

According to the voting system 1 having the above configuration, voting fraud can be prevented and analysis of voting can be performed while keeping voting information secret. Therefore, according to the voting system 1, electronic voting can be securely conducted.

Figure 2:
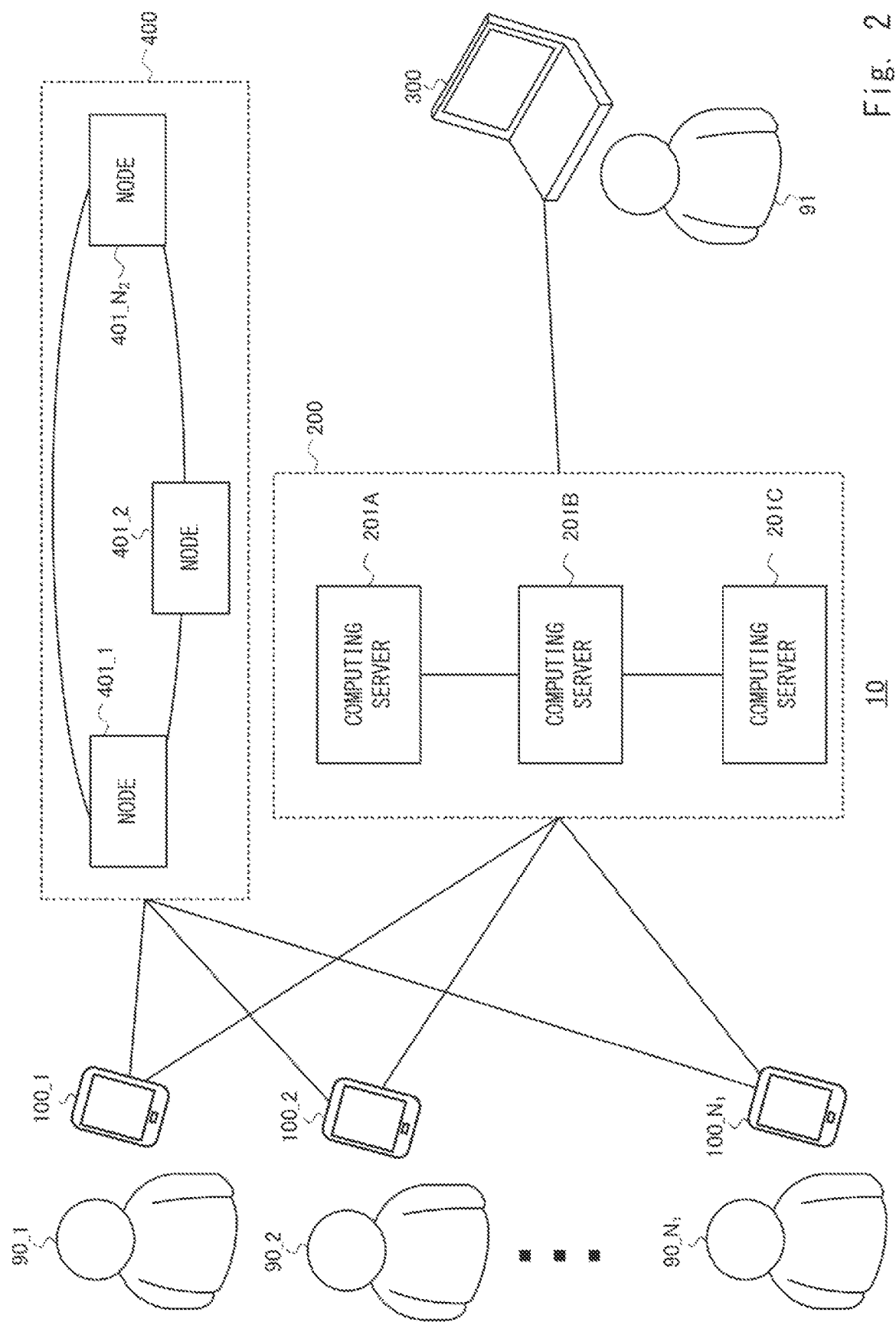
FIG. 2 is a schematic diagram showing an example of a configuration of a voting system according to the example embodiment.

Next, details of the example embodiment will be described. FIG. 2 is a schematic diagram showing an example of a configuration of a voting system 10 according to the example embodiment. The voting system 10 is a system that receives votes from voters and performs analysis of a result of the voting. As an example, the voting system 10 shown in FIG. 2 includes voter terminals 100_1, 100_2, . . . , and 100_$N_1$, a computing server group 200, an administrator terminal 300, and a blockchain network 400. Note that, in FIG. 2, in order to aid the understanding thereof, voters 90_1, 90_2, . . . , and 90_$N_1$ and an administrator 91 are also illustrated in addition to the voting system 10. In the following description, the voter terminals 100_1, 100_2, . . . , and 100_$N_1$ are referred to as the voter terminals 100 when they are referred to without being particularly distinguished from each other, and the voters 90_1, 90_2, . . . , and 90_$N_1$ are referred to as the voters 90 when they are referred to without being particularly distinguished from each other.

The blockchain network 400 is a network composed of nodes 401_1, 401_2, . . . , and 401_$N_2$ that manage the blockchain, and may be provided, for example, as a cloud service. Note that, in the following description, the nodes 401_1, 401_2, . . . , and 401_$N_2$ are referred to as the nodes 401 when they are referred to without being particularly distinguished from each other. Each of the nodes 401 is a node that composes the blockchain network 400, and is a server that shares a blockchain, performs processing for recording transaction data in the blockchain, and so on. The node 401 receives transaction data to be written into the blockchain from another apparatus (e.g., the voter terminal 100 or the administrator terminal 300) and performs processing for recording it in the blockchain.

Figure 3:
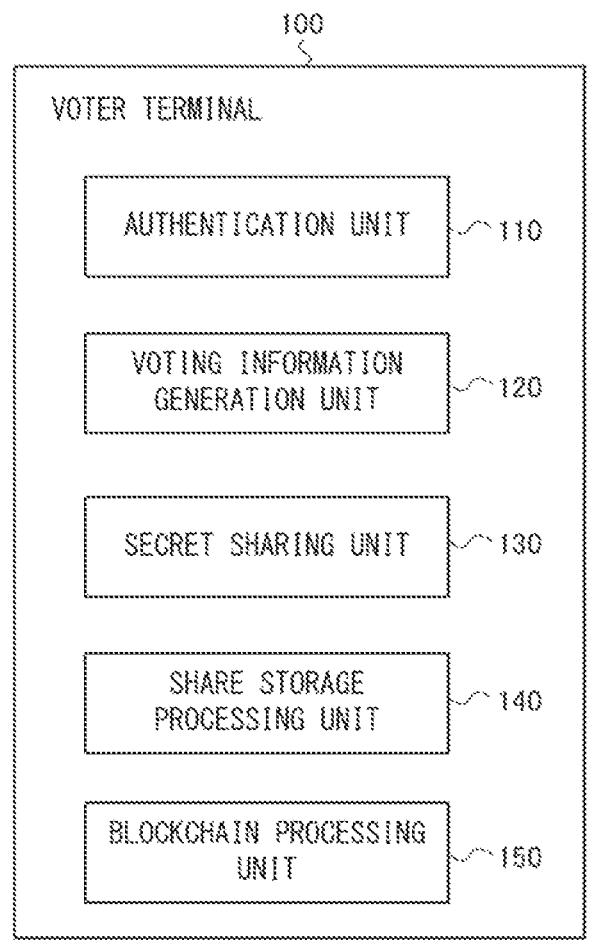
FIG. 3 is a block diagram showing an example of a functional configuration of a voter terminal.

The voter terminal 100 is a terminal apparatus used by the voter 90 for voting, such as a smartphone, a tablet terminal, and a personal computer. The voters 90 uses the respective voter terminals 100 to vote. That is, the voter 90_i (where $1 \leq i \leq N_1$) uses the voter terminal 100_i to vote. FIG. 3 is a block diagram showing an example of a functional configuration of the voter terminal 100. As shown in FIG. 3, the voter terminal 100 includes an authentication unit 110, a voting information generation unit 120, a secret sharing unit 130, a share storage processing unit 140, and a blockchain processing unit 150.

The authentication unit 110 authenticates the voter 90 by using personal information of the voter 90. The personal information is information input in the voter terminal 100, and may be, for example, biometric information of the voter 90. Note that, for example, the biometric information includes, but is not limited to, facial features, fingerprint features, and iris features of the voter 90. Although authentication can be made more convenient by using biometric information, the authentication unit 110 may instead perform authentication by using personal information such as the ID and password of the voter 90. The authentication unit 110 may also perform authentication by transmitting personal information to an authentication server (not shown) and receiving a result of the authentication from the authentication server.

The voting information generation unit 120 generates voting information corresponding to an input operation performed by the voter 90. For example, the voter 90 performs an input operation to select the content of the voting through an input apparatus included in the voter terminal 100. By doing so, the content of the voting is determined. Note that the content of the voting is not limited to the selection of a specific person from among candidates such as heads or assembly members, and may instead be the selection of options (e.g., yes or no) in a predetermined public opinion poll. The voting information generation unit 120 generates data including the determined content of the voting as voting information. Note that the voting information generation unit 120 may generate voting information including not only the content of the voting but also various types of information. In this example embodiment, the voting information generation unit 120 generates voting information including, for example, the content of the voting and information indicating the attributes of the voter 90. Note that the information indicating the attributes of the voter 90 may be, for example, information indicating the gender of the voter 90, information indicating the age of the voter 90, or information indicating the affiliation of the voter 90. These pieces of information are merely examples, and other information may be used as information indicating the attributes. Further, the voting information may include information indicating the date and time when the voting information was generated or information for identifying the voter 90. In this example embodiment, the voting information generation unit 120 generates voting information when the authentication unit 110 successfully authenticates the voter 90. Therefore, the voter 90 can be correctly identified.

The secret sharing unit 130, which corresponds to the secret sharing unit 2 shown in FIG. 1, encrypts voting information generated by the voting information generation unit 120 using a secret sharing method. That is, the secret sharing unit 130 performs secret sharing processing on voting information in accordance with a predetermined secret sharing method, and generates a plurality of shares from this voting information. For example, the secret sharing unit 130 may use All or Nothing Transformation (AONT) as a secret sharing method. However, it is merely an example, and the secret sharing unit 130 may perform secret sharing processing by other secret sharing methods.

In general, the secret sharing method cannot restore original data from one of the generated shares, but can restore original data by collecting a predetermined number of shares. Therefore, data can be prevented from being leaked by storing a plurality of generated shares in a distributed manner. In this example embodiment, the share storage processing unit 140 stores shares generated from one piece of voting information in three servers, namely, computing servers 201A, 201B, and 201C, in a distributed manner, which servers will be described later. Therefore, the share storage processing unit 140 transmits the generated shares to the computing servers 201A, 201B, and 201C in a distributed manner, and causes share storage units 210 included in the respective computing servers 201A, 201B, and 201C to store them in a distributed manner. By doing so, voting information can be prevented from being leaked. Note that, in this example embodiment, as described above, processing of secret sharing is performed by the terminal apparatus used by the voter 90 to generate voting information. That is, secret sharing is performed before voting information is transmitted from the terminal apparatus (i.e., the voter terminal 100) to another apparatus. Therefore, the occurrence of leakage of voting information during transmission can be prevented, and thus a system can be provided which is more secure than a system in which secret sharing is performed after transmission of voting information to another apparatus.

The blockchain processing unit 150, which corresponds to the blockchain processing unit 4 shown in FIG. 1, transmits, to the node 401 that manages a blockchain, transaction data of voting in order to record the transaction data in the blockchain. Specifically, for example, the blockchain processing unit 150 generates transaction data of voting and broadcasts the generated transaction data to the blockchain network 400. That is, the blockchain processing unit 150 transmits transaction data to each of the nodes 401 composing the blockchain network 400. The broadcast transaction data is processed by the nodes 401 and then added to the blockchain as a block including one or a plurality of transaction data.

The blockchain processing unit 150 may generate data including the following information as transaction data. For example, the blockchain processing unit 150 may generate transaction data including data for identifying the voter 90, data indicating the content of the voting, and data indicating the date and time of the conduction of the voting. Note that the blockchain processing unit 150 may generate transaction data including only some of these pieces of data. For example, the blockchain processing unit 150 may generate transaction data including only data for identifying the voter 90 or transaction data including data identifying for the voter 90 and data indicating the date and time of the conduction of the voting. Note that the data for identifying the voter 90 may be data that enables the voter 90 to be identified, and it may be the name or the ID of the voter 90. Further, the date and time of the conduction of the voting may be specifically the date and time of the generation of voting information or the date and time of the transmission of voting information to the blockchain network 400.

Further, when cancellation of an earlier voting is permitted, the blockchain processing unit 150 may generate transaction data including data related to the cancellation of the voting and transmit the transaction data to the blockchain network 400. The data related to the cancellation of the voting may be, for example, one of data for identifying a person who performed the cancellation, data for specifying the voting to be cancelled, or data indicating the date and time when the cancellation was performed, or any combination thereof. Note that the blockchain processing unit 150 sets a user identified by authentication performed by the authentication unit 110 as the person who performed the cancellation. Further, when revoting is permitted, the blockchain processing unit 150 may generate transaction data for the revoting and transmit it to the blockchain network 400.

Note that the blockchain processing unit 150 may calculate a hash value of data to be recorded as transaction data and use the calculated hash value as transaction data. Further, although some examples of data to be included as transaction data have been described, these are merely examples and other data may be included in transaction data. For example, information indicating the attributes of the voter 90 may be included in transaction data.

As described above, by generating transaction data including various types of data, it is possible to record various types of histories related to the voting in the blockchain.

Figure 4:
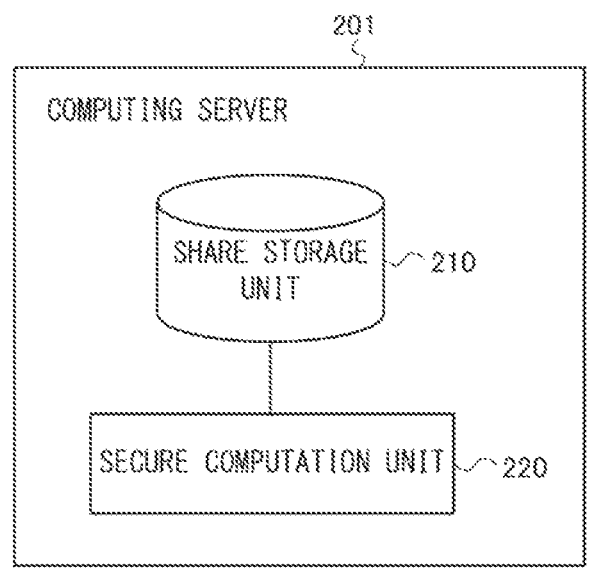
FIG. 4 is a block diagram showing an example of a functional configuration of a computing server.

Next, the computing server group 200 will be described. The computing server group 200 is a server group that stores shares generated by secret sharing processing in a distributed manner and performs secure computation by using the shares stored in a distributed manner, and in this example embodiment, the computing server group 200 includes three computing servers 201A, 201B, and 201C. The computing servers 201A, 201B, and 201C may be servers managed by organizations (e.g., a municipality, an election administration commission, and a third-party organization) different from each other. In the following description, when the computing servers 201A, 201B, and 201C are referred to as the computing servers 201 when they are referred to without being particularly distinguished from each other. FIG. 4 is a block diagram showing an example of a functional configuration of the computing server 201. As shown in FIG. 4, each of the computing servers 201 includes the share storage unit 210 and a secure computation unit 220.

The share storage unit 210, which corresponds to the share storage unit 3 shown in FIG. 1, is a storage that stores shares generated by the secret sharing unit 130 of the voter terminal 100. As described above, a plurality of shares generated for one piece of voting information are stored in the share storage unit 210 of each of the computing servers 201 in a distributed manner.

The secure computation unit 220, which corresponds to the secure computation unit 5 shown in FIG. 1, performs secure computation for analyzing voting by using the shares stored in the share storage unit 210. In this example embodiment, the secure computation units 220 of the respective computing servers 201A, 201B, and 201C perform multi-party calculation (MPC) in cooperation with the secure computation unit 220 of another computing server 201. In this example embodiment, the secure computation unit 220 performs secure computation and transmits a result of the secure computation to the administrator terminal 300 in response to a request from the administrator terminal 300. The result of the secure computation transmitted by each of the secure computation units 220 is a secrecy-shared result of the computation. Therefore, the final result of the computation can be obtained by collecting the results of the secure computation transmitted by the secure computation units 220 and then performing decryption processing.

Figure 5:
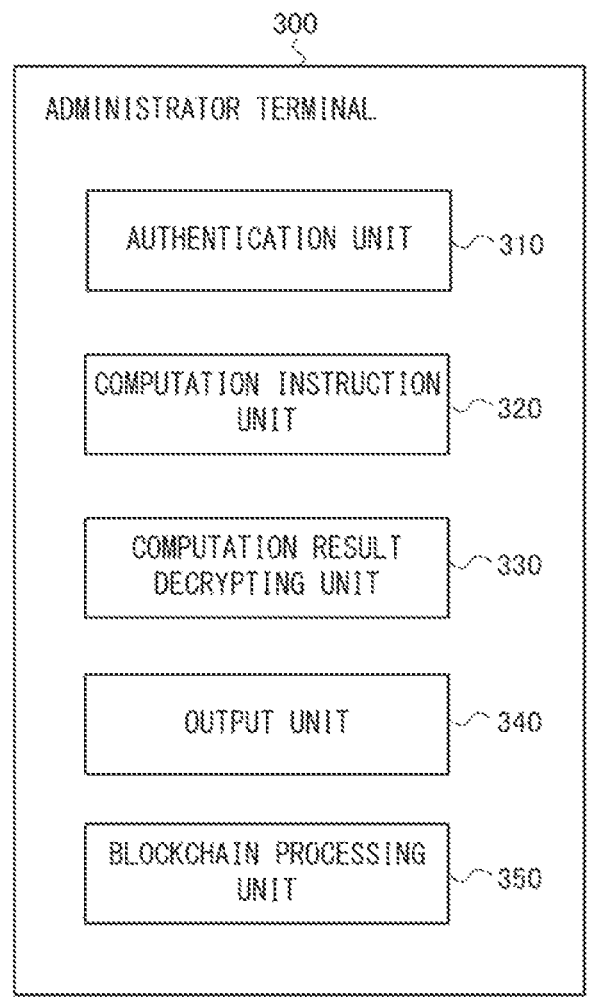
FIG. 5 is a block diagram showing an example of a functional configuration of an administrator terminal.

Next, the administrator terminal 300 will be described. The administrator terminal 300 is a terminal apparatus used by the administrator 91, such as an election administrator, to acquire results of analysis of voting from a plurality of voters, and is, for example, a smartphone, a tablet terminal, or a personal computer. FIG. 5 is a block diagram showing an example of a functional configuration of the administrator terminal 300. As shown in FIG. 5, the administrator terminal 300 includes an authentication unit 310, a computation instruction unit 320, a computation result decrypting unit 330, an output unit 340, and a blockchain processing unit 350.

The authentication unit 310 authenticates the administrator 91 by using personal information of the administrator 91. This personal information is information input to the administrator terminal 300 and may be, for example, biometric information of the administrator 91. Note that, for example, the biometric information includes, but is not limited to, facial features, fingerprint features, and iris features of the administrator 91. The authentication unit 310 may perform authentication by using personal information such as the ID and password of the administrator 91. The authentication unit 310 may also perform authentication by transmitting personal information to an authentication server (not shown) and receiving a result of the authentication from the authentication server.

In order to perform analysis specified by an input operation performed by the administrator 91, the computation instruction unit 320 instructs the computing server 201 to execute secure computation according to the specified analysis. That is, the computation instruction unit 320 instructs the computing server 201 to perform secure computation for analyzing voting in response to an input operation performed by the administrator 91. In other words, the computation instruction unit 320 transmits a request for the execution of secure computation to the computing server 201. The secure computation for analyzing voting may be statistical processing using voting information. That is, the secure computation unit 220 of the computing server 201 may calculate a result of statistical processing using voting information as the result of the secure computation. For example, the number of votes for each option (each candidate) may be calculated. Further, in particular, when voting information includes information indicating the attributes of the voter 90, the secure computation for analyzing voting may be statistical processing related to the attributes. That is, in this case, the secure computation unit 220 of the computing server 201 may calculate statistical data related to the attributes of the voter 90. For example, the distribution of the ages, the age groups, or the genders of the voters 90 may be calculated for each option they voted for, or the distribution of the options for the voting destination may be calculated for each age, each age group, or each gender. In this example embodiment, the computation instruction unit 320 instructs the computing server 201 to execute secure computation when the authentication unit 310 successfully authenticates the administrator 91. Therefore, a user who has instructed the execution of the secure computation can be correctly identified.

The computation result decrypting unit 330 acquires the result of the secure computation performed based on an instruction provided by the computation instruction unit 320 from the computing servers 201 and performs decryption processing. The computation result decrypting unit 330 obtains the final result of the computation (the result of analysis of the voting) by performing decryption processing according to a predetermined secret sharing method (e.g., AONT) used by the secret sharing unit 130 of the voter terminal 100.

The output unit 340 outputs the final result of the computation obtained by the computation result decrypting unit 330, that is, the result of analysis of the voting. For example, the output unit 340 may output the final result of the computation to a display connected to the administrator terminal 300 or may transmit it to another apparatus.

The blockchain processing unit 350 transmits, to the node 401 that manages a blockchain, transaction data about the execution of the secure computation in order to record the transaction data in the blockchain. Specifically, for example, the blockchain processing unit 350 generates transaction data about the execution of the secure computation and broadcasts the generated transaction data to the blockchain network 400. That is, the blockchain processing unit 350 transmits transaction data to each of the nodes 401 composing the blockchain network 400. The broadcast transaction data is processed by the nodes 401 and then added to the blockchain as a block including one or a plurality of transaction data.

The blockchain processing unit 350 may generate data including the following information as transaction data. For example, the blockchain processing unit 350 may generate transaction data including data for identifying the user (the administrator 91) who has instructed the execution of the secure computation, data indicating the content of analysis obtained by the execution of the secure computation, and data indicating the date and time of the execution of the secure computation. Note that the blockchain processing unit 350 may generate transaction data including only some of these pieces of data. For example, the blockchain processing unit 350 may generate transaction data including only data for identifying a user or transaction data including data for identifying a user and data indicating the date and time of the execution of the secure computation. Note that the data for identifying a user may be data that enables a user to be identified, and it may be the name or the ID of a user. Further, the date and time of the execution of the secure computation may be the date and time of the provision of the instruction by the computation instruction unit 320, the date and time of the decryption by the computation result decrypting unit 330, or the date and time of the output by the output unit 340.

Note that the blockchain processing unit 350 may calculate a hash value of data to be recorded as transaction data and use the calculated hash value as transaction data. Further, although some examples of data to be included as transaction data have been described, these are merely examples and other data may be included in transaction data. As described above, by generating transaction data including various types of data, it is possible to record various types of histories related to the execution of the analysis in the blockchain.

Figure 6:
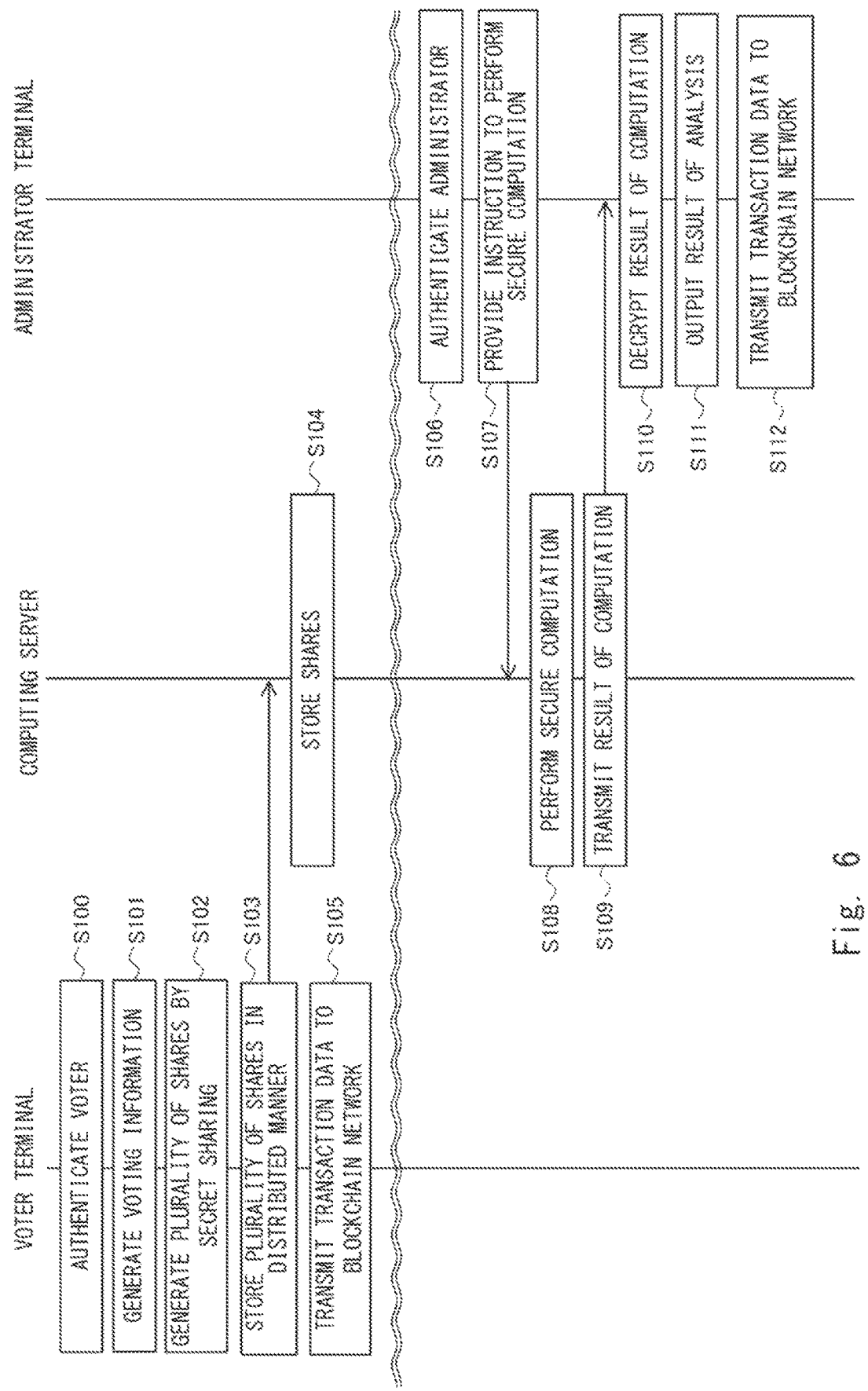
FIG. 6 is a sequence chart showing an example of a flow of operations performed by the voting system according to the example embodiment.

Next, a flow of operations performed by the voting system 10 will be described. FIG. 6 is a sequence chart showing an example of the flow of the operations performed by the voting system 10. The flow of the operations will be described below with reference to the sequence chart shown in FIG. 6.

In Step S100, the authentication unit 110 of the voter terminal 100 authenticates the voter 90.

When the voter 90 is successfully authenticated, the voting information generation unit 120 of the voter terminal 100 generates, in Step S101, voting information corresponding to an input operation performed by the voter 90.

Next, in Step S102, the secret sharing unit 130 of the voter terminal 100 generates a plurality of shares from the voting information generated in Step 101 by secret sharing.

Next, in Step S103, the share storage processing unit 140 of the voter terminal 100 stores the plurality of shares generated in Step S102 in three servers, namely, the computing servers 201A, 201B, and 201C, in a distributed manner. Thus, in Step S104, the shares are stored in the share storage units 210 of the computing servers 201A, 201B, and 201C.

In Step S105, the blockchain processing unit 150 of the voter terminal 100 generates transaction data of voting and broadcasts the generated transaction data to the blockchain network 400.

The processes in Steps S100 to S105 are performed in the voter terminal 100 of each of the voters. As a result, the shares of the voting information transmitted from the voter terminals 100 of a plurality of voters are stored in the share storage units 210 of the computing servers 201.

Then, in Step S106, the authentication unit 310 of the administrator terminal 300 authenticates the administrator 91.

When the administrator 91 is successfully authenticated, the computation instruction unit 320 of the administrator terminal 300 instructs, in Step S107, the computing server 201 to perform secure computation for analyzing the voting in response to an input operation performed by the administrator 91.

In response to this instruction, in Step S108, the secure computation unit 220 of each of the computing servers 201 performs the secure computation by using the share stored in the share storage unit 210.

Then, in Step S109, the secure computation unit 220 of each of the computing servers 201 transmits a result of the secure computation to the administrator terminal 300.

Next, in Step S110, the computation result decrypting unit 330 of the administrator terminal 300 performs decryption processing on the acquired result of the secure computation, and obtains a result of the analysis of the voting.

Next, in Step S111, the output unit 340 of the administrator terminal 300 outputs the result of the analysis obtained in Step S110.

Next, in Step S112, the blockchain processing unit 350 of the administrator terminal 300 generates transaction data about the execution of the secure computation and broadcasts the generated transaction data to the blockchain network 400.

The flow of the operations performed by the voting system 10 has been described above. These operations described above are merely examples and various changes can be made. For example, a timing at which transaction data is recorded in the blockchain is not limited to the timing shown in FIG. 6 and can be changed to any timing.

The example embodiment has been described above. In the voting system according to this example embodiment, voting information is subjected to secret sharing processing and then stored in a distributed manner. Then, analysis of voting is performed by secure computation. Further, histories are recorded in the blockchain. Thus, according to the voting system 10, voting fraud can be prevented and analysis of voting can be performed while keeping voting information secret. Therefore, according to the voting system 10, electronic voting can be securely conducted. Note that various changes can be made to the above-described example embodiment. For example, each of the computing servers 201 may serve as the node 401 of the blockchain network 400. That is, for example, the storage of the computing server 201 may store the blockchain and the computing server 201 may perform processing for recording transaction data in the blockchain. Further, when data regarding the shares stored in the share storage unit 210 is lost, the computing server 201 may perform data recovery in accordance with an algorithm of a predetermined secret sharing method (e.g., AONT). Further, in this example embodiment, although the voting system 10 includes three computing servers 201, the number of computing servers 201 is not limited to three and may be any number as long as it is a plural number.

Further, although the processing of the voter terminal 100, the computing server 201, the administrator terminal 300, or the node 401 can be implemented by a hardware circuit, it can be implemented, for example, by causing a processor of a computer to execute a computer program.

Figure 7:
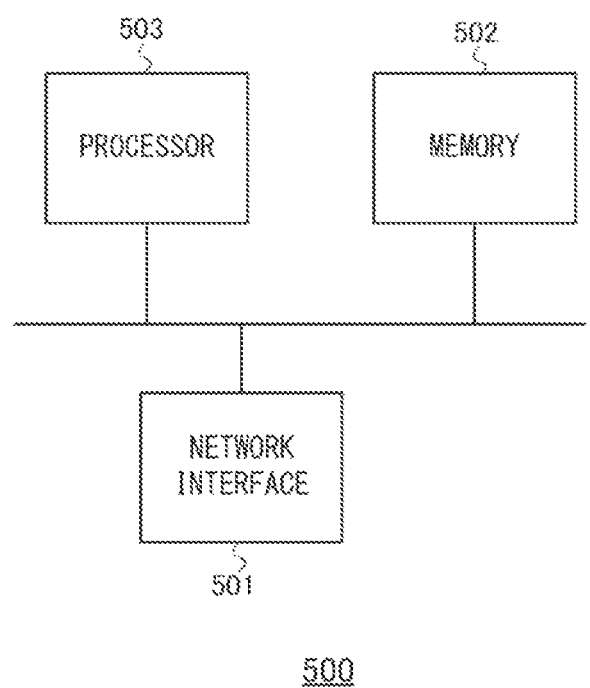
FIG. 7 is a block diagram showing an example of a configuration of a computer.

FIG. 7 is a block diagram showing an example of a configuration of a computer 500 that implements the processing of the voter terminal 100, the computing server 201, the administrator terminal 300, or the node 401. As shown in FIG. 7, the computer 500 includes a network interface 501, a memory 502, and a processor 503.

The network interface 501 is used to communicate with any other apparatus.

The memory 502 is composed of, for example, a combination of volatile memory and non-volatile memory. The memory 502 is used to store software (a computer program) including at least one instruction executed by the processor 503, and the like.

The processor 503 loads the software (the computer program) from the memory 502 and executes it, thereby performing the processing of the voter terminal 100, the computing server 201, the administrator terminal 300, or the node 401.

The processor 503 may be, for example, a microprocessor, a Micro Processor Unit (MPU), or a Central Processing Unit (CPU). The processor 503 may include a plurality of processors.

Note that the above-described program can be stored and provided to a computer using any type of non-transitory computer readable media. Non-transitory computer readable media include any type of tangible storage media.

Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Although the present invention has been described above with reference to an example embodiment, the present invention is not limited to the above-described example embodiment. Various changes that can be understood by those skilled in the art can be made to the configuration and details of the present invention within the scope of the invention.

The whole or part of the example embodiment disclosed above can be described as, but not limited to, the following supplementary notes.

Supplementary Note 1

A voting system comprising:
secret sharing means for generating a plurality of shares from voting information by secret sharing;

a plurality of share storage means for storing the plurality of shares in a distributed manner;

first blockchain processing means for transmitting, to a node configured to manage a blockchain, transaction data of voting conducted using the voting information in order to record the transaction data in the blockchain; and secure computation means for performing secure computation for analyzing the voting by using the shares stored in a distributed manner.

Supplementary Note 2

The voting system according to supplementary note 1, wherein processing of the secret sharing means is performed by a terminal apparatus used by a voter to generate the voting information.

Supplementary Note 3

The voting system according to supplementary note 1 or 2, further comprising:
authentication means for authenticating a voter by using personal information of the voter; and
voting information generation means for generating the voting information corresponding to an input operation performed by the voter when the voter is successfully authenticated.

Supplementary Note 4

The voting system according to supplementary note 3, wherein the personal information is biometric information of the voter.

Supplementary Note 5

The voting system according to any one of supplementary notes 1 to 4, wherein the transaction data recorded in the blockchain includes data for identifying the voter.

Supplementary Note 6

The voting system according to supplementary note 5, wherein the transaction data recorded in the blockchain further includes data indicating a content of the voting.

Supplementary Note 7

The voting system according to supplementary note 5 or 6, wherein the transaction data recorded in the blockchain further includes data indicating a date and time of execution of the voting.

Supplementary Note 8

The voting system according to any one of supplementary notes 1 to 7, wherein the transaction data recorded in the blockchain includes data related to cancellation of the voting.

Supplementary Note 9

The voting system according to any one of supplementary notes 1 to 8, further comprising second blockchain processing means for transmitting, to the node, transaction data about execution of the secure computation in order to record the transaction data in the blockchain.

Supplementary Note 10

The voting system according to supplementary note 9, wherein the transaction data about the execution of the secure computation recorded in the blockchain includes data for identifying a user who has instructed the execution of the secure computation.

Supplementary Note 11

The voting system according to supplementary note 10, wherein the transaction data about the execution of the secure computation recorded in the blockchain further includes data indicating a content of analysis obtained by the execution of the secure computation.

Supplementary Note 12

The voting system according to supplementary note 10 or 11, wherein the transaction data about the execution of the secure computation recorded in the blockchain further includes data indicating a date and time of the execution of the secure computation.

Supplementary Note 13

The voting system according to any one of supplementary notes 1 to 12, wherein
the voting information includes information indicating attributes of the voter, and
the secure computation means calculates statistical data related to the attributes.

Supplementary Note 14

A voting method comprising:
generating a plurality of shares from voting information by secret sharing;
storing the plurality of shares in a distributed manner;
transmitting, to a node configured to manage a blockchain, transaction data of voting conducted using the voting information in order to record the transaction data in the blockchain; and
performing secure computation for analyzing the voting by using the shares stored in a distributed manner.

REFERENCE SIGNS LIST

1 VOTING SYSTEM
2 SECRET SHARING UNIT
3 SHARE STORAGE UNIT
4 BLOCKCHAIN PROCESSING UNIT
5 SECURE COMPUTATION UNIT
10 VOTING SYSTEM
90 VOTER
91 ADMINISTRATOR
100 VOTER TERMINAL
110 AUTHENTICATION UNIT
120 VOTING INFORMATION GENERATION UNIT
130 SECRET SHARING UNIT
140 SHARE STORAGE PROCESSING UNIT
150 BLOCKCHAIN PROCESSING UNIT
200 COMPUTING SERVER GROUP
201 COMPUTING SERVER

210 SHARE STORAGE UNIT
220 SECURE COMPUTATION UNIT
300 ADMINISTRATOR TERMINAL
310 AUTHENTICATION UNIT
320 COMPUTATION INSTRUCTION UNIT
330 COMPUTATION RESULT DECRYPTING UNIT
340 OUTPUT UNIT
350 BLOCKCHAIN PROCESSING UNIT
400 BLOCKCHAIN NETWORK
401 NODE
500 COMPUTER
501 NETWORK INTERFACE
502 MEMORY
503 PROCESSOR

What is claimed is:

1. A voting system comprising:
a plurality of storages;
at least one memory storing instructions; and
at least one processor configured to execute the instructions to:
generate a plurality of shares from voting information using secret sharing;
cause the storages to store the plurality of shares in a distributed manner;
transmit, to a node configured to manage a blockchain, transaction data of voting conducted using the voting information in order to record the transaction data in the blockchain;
perform secure computation for analyzing the voting by using the shares stored in a distributed manner; and
transmit, to the node, transaction data about execution of the secure computation in order to record the transaction data in the blockchain,
wherein the transaction data about the execution of the secure computation recorded in the blockchain includes data for identifying a user who has instructed the execution of the secure computation.

2. The voting system according to claim 1, wherein processing for generating the plurality of shares is performed by a terminal apparatus used by a voter to generate the voting information.

3. The voting system according to claim 1, wherein the processor is further configured to execute the instructions to:
authenticate a voter using personal information of the voter; and
generate the voting information corresponding to an input operation performed by the voter when the voter is successfully authenticated.

4. The voting system according to claim 3, wherein the personal information is biometric information of the voter.

5. The voting system according to claim 1, wherein the transaction data of the voting recorded in the blockchain includes data for identifying a voter.

6. The voting system according to claim 5, wherein the transaction data of the voting recorded in the blockchain further includes data indicating content of the voting.

7. The voting system according to claim 5, wherein the transaction data of the voting recorded in the blockchain further includes data indicating a date and time of execution of the voting.

8. The voting system according to claim 1, wherein the transaction data of the voting recorded in the blockchain includes data related to cancellation of the voting.

9. The voting system according to claim 1, wherein the transaction data about the execution of the secure computation recorded in the blockchain further includes data indicating content of analysis obtained by the execution of the secure computation.

10. The voting system according to claim 1, wherein the transaction data about the execution of the secure computation recorded in the blockchain further includes data indicating a date and time of the execution of the secure computation.

11. The voting system according to claim 1, wherein
the voting information includes information indicating attributes of a voter, and
the processor is further configured to execute the instructions to calculate statistical data related to the attributes of the voter.

12. A voting method performed by a computer and comprising:
generating a plurality of shares from voting information using secret sharing;
storing the plurality of shares in a distributed manner;
transmitting, to a node configured to manage a blockchain, transaction data of voting conducted using the voting information in order to record the transaction data in the blockchain;
performing secure computation for analyzing the voting by using the shares stored in a distributed manner; and
transmitting, to the node, transaction data about execution of the secure computation in order to record the transaction data in the blockchain,
wherein the transaction data about the execution of the secure computation recorded in the blockchain includes data for identifying a user who has instructed the execution of the secure computation.

* * * * *